Aug. 1, 1939.    J. E. STRIETELMEIER    2,168,005
BUN PAN
Filed Sept. 27, 1937    2 Sheets-Sheet 1
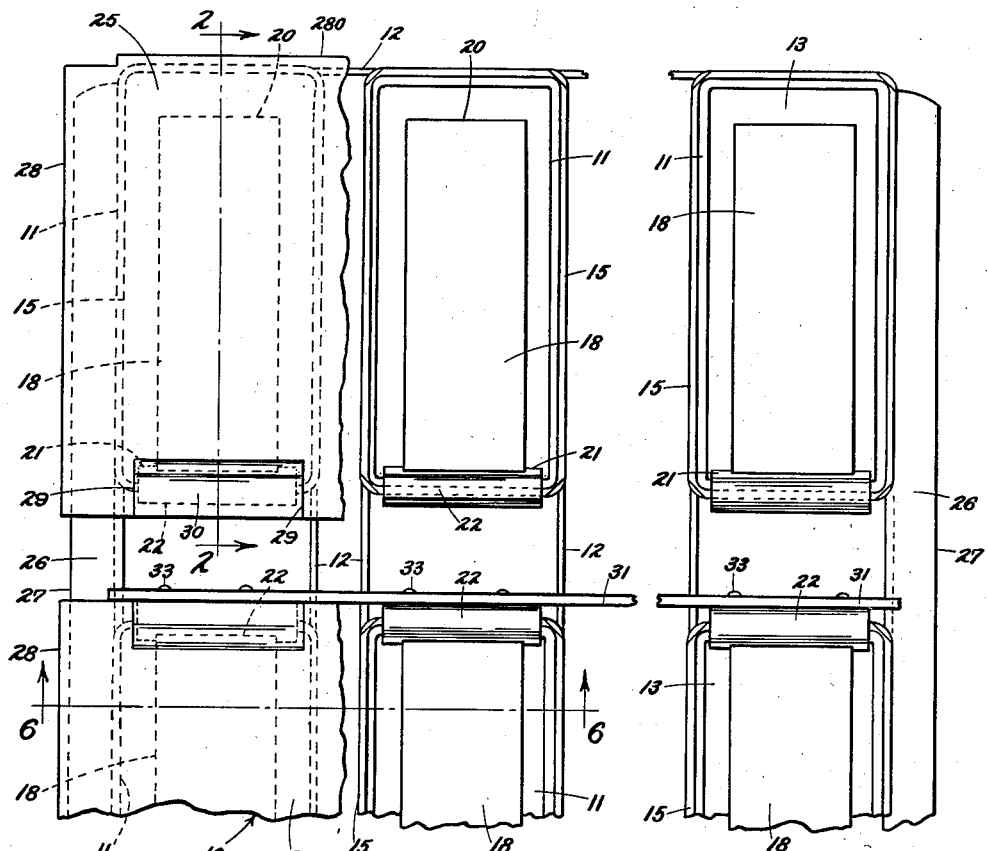
Fig. 1
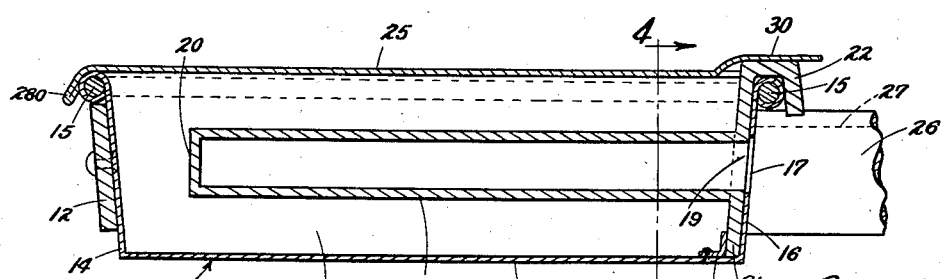
Fig. 3    Fig. 2
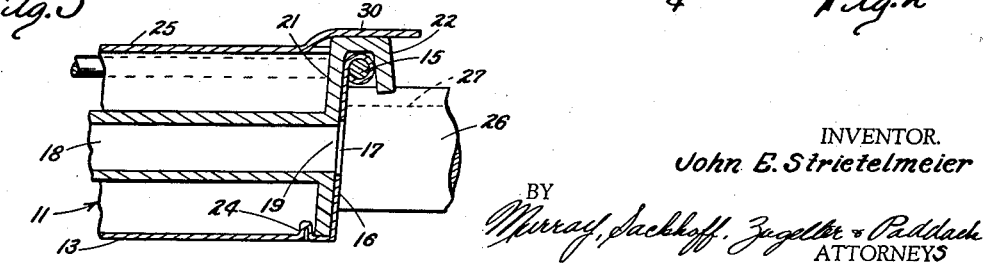
INVENTOR.
John E. Strietelmeier
BY
Murray, Jackhoff, Zugelter & Paddack
ATTORNEYS Aug. 1, 1939.　　　J. E. STRIETELMEIER　　　2,168,005
BUN PAN
Filed Sept. 27, 1937　　　2 Sheets-Sheet 2

INVENTOR.
John E. Strietelmeier
BY
Murray, Sackhoff, Zugelter & Paddack
ATTORNEYS Patented Aug. 1, 1939

2,168,005

UNITED STATES PATENT OFFICE 2,168,005

BUN PAN

John E. Strietelmeier, Cincinnati, Ohio, assignor to Bar-B-Buns, Inc., Cincinnati, Ohio, a corporation of Ohio Application September 27, 1937, Serial No. 165,802

6 Claims. (Cl. 53—6)

The present invention relates to bun pans and is particularly directed to a means for forming an inset in baked products coincident with the baking process thereof.

It is therefore an object of the invention to provide an improved detachable device for a bun pan which forms an inset or cavity in a baked product during the baking process.

Another object of the invention is to provide a bun inset forming device which imparts a crusted or hardened surface to the interior inset wall of a bun formed by the employment of the device.

A further object of the invention is to provide a novel means for rigidly fastening the aforementioned device to the interior of a bun pan.

Other objects of the invention will be apparent from the following specification and drawings, in which:

Fig. 1 is a fragmental plan view of a pan unit showing my device in operative position thereon.

Fig. 2 is an enlarged cross-sectional view taken on line 2—2 of Fig. 1.

Fig. 3 is a cross-sectional view showing a modification of my core positioning means.

Figure 4:
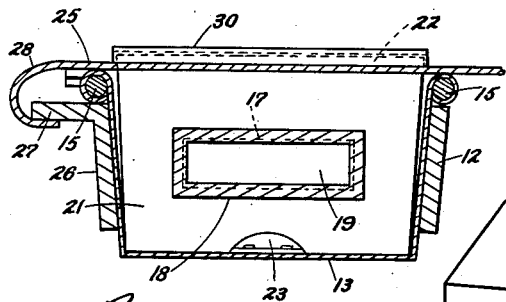
Fig. 4 is a cross-sectional view taken on line 4—4 of Fig. 2.
Figure 5:
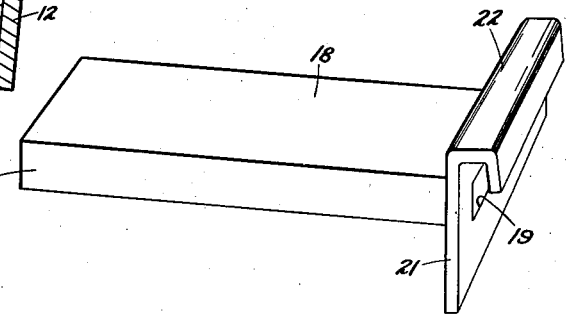
Fig. 5 is a perspective view of my novel pan attachment.

The embodiment of my invention comprises a pan unit 10 consisting of a plurality of identical rectangular bun pans 11 held in spaced relationship by straps 12. The straps are riveted or welded to the pans in any suitable manner. Each bun pan has a bottom 13 and side walls 14 diverging upwardly from the bottom, the upper extremities of said walls being provided with a wire rolled edge 15. One side wall 16 of each pan has an aperture 17 (Fig. 2) formed wholly therethrough.

My novel pan attachment comprises a hollow longitudinal core 18 having an open end 19 and a closed end 20. The core is removably held centrally of the pan interior by a plate 21 positioned against the pan side wall 16 provided with the aperture 17. As shown in Fig. 4 the vertically disposed edges of the plate are inclined to substantially conform to the slope of the side wall 16 to preclude sidewise movement of the plate. The core is preferably made integral with the plate but any suitable means may be employed to fasten these elements together. The plate is provided at its upper end with a hook portion 22 which is formed to snugly engage the wire rolled edge 15 of the pan. To provide further rigidity to the plate when positioned within the pan, a lug 23 (Figs. 2 and 3) is fastened to the bottom thereof and spaced from the side wall 16 a distance substantially equal to the thickness of the plate 21. From the foregoing it will be understood that the combination of the hook fastening means, the tapered formation of the plate and the lug 23 provides a rigid fastening means for the core supporting plate 21 when my attachment is positioned within a pan. A modification of the lug 23 is shown in Fig. 3, which comprises the formation of an upwardly extending indentation 24 in the bottom of the bun pan. The core is held centrally of the pan interior by this plate so that the open end 19 is disposed to register with the aperture 17 in the pan side wall 16 whilst the closed core end terminates adjacent the side wall opposed to the side wall 16 containing the aperture. During the baking process, heated air can pass through the aperture and circulate a substantial distance into the hollow core adjacent the aperture. The remaining part of the hollow core will be heated by convection, thus imparting a relatively high temperature to the core which results in the formation of a crusted or hardened surface to the interior inset wall of the bun.

A cover 25 is slidably positioned on the pans by means of end straps 26 fastened to the pan unit which are provided with extensions 27. The cover has formed in the edges adjacent the extensions elongated rounded portions 28, the ends thereof being adapted to engage the underside of said extensions whereby to firmly hold the cover against the top edges of the pans. A stop is provided for the cover by forming a longitudinal, downward fold 280 along its rear edge.

Figure 6:
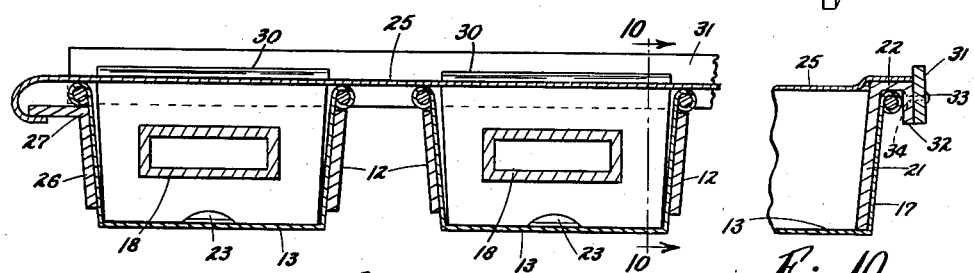
Fig. 6 is a cross-sectional view taken on line 6—6 of Fig. 1 showing a means of effecting a pan attachment unit.
Figure 10:
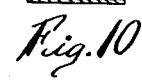
Fig. 10 is a cross-sectional view taken on line 10—10 of Fig. 6.

As shown in the pan unit arrangement of Fig. 1 and in Fig. 2, the front portion of the cover extends over the top edge of the hooked portion of the core positioning plates by providing slits 29 in the cover to form an offset 30 therein which engages the top of the plate to preclude upward movement of the core during the baking process. The lower cover plate in Fig. 1 extends only to the cross bar 31 when my attachment devices are held together by said bar to form an attachment unit (Fig. 6). The bar 31 (Fig. 10) is fastened to the downward extension 32 on the hook portion of each plate included in the attachment unit, by means of rivets 33 which have flattened surfaces on their inner ends 34 to allow sufficient clearance for the wire rolled top edge of the pan when said hook portion engages the latter element.

Figure 8:
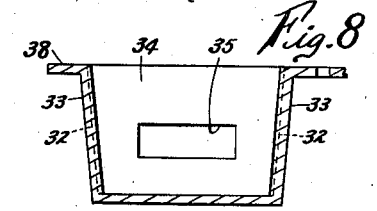
Fig. 8 is a cross-sectional view taken on line 8—8 of Fig. 7.
Figure 9:
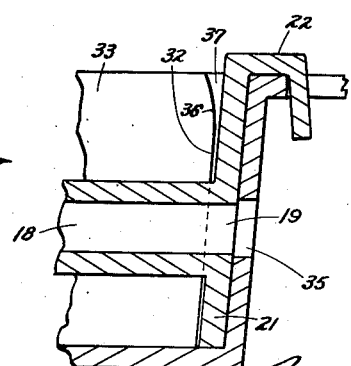
Fig. 9 is an enlarged cross-sectional view taken on line 9—9 of Fig. 7.
Figure 7:
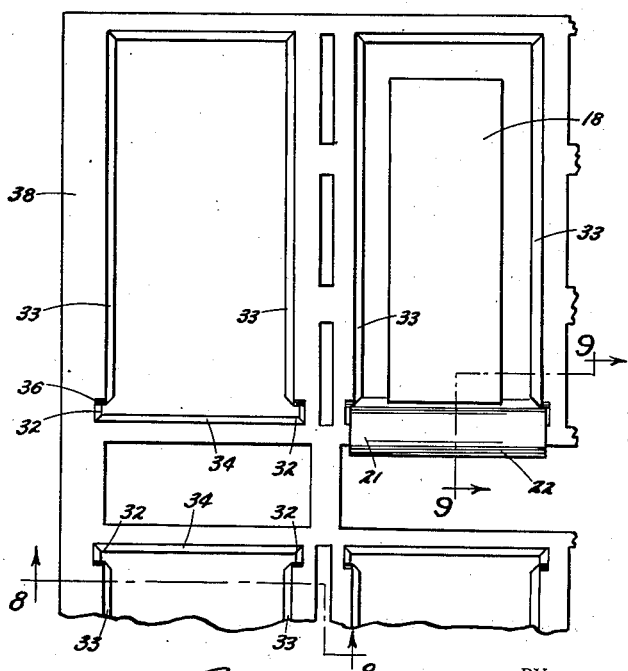
Fig. 7 is a fragmental plan view of a modification of my device.

My attachment may also be employed upon an aluminum pan or a pan cast of any other suitable metal. In this type pan as shown in Figs. 7 and 8, a vertical groove 32 is cast in opposite side walls 33 which engage the side wall 34 having an aperture 35 therein. The grooves are adapted to receive the vertical edges of the core positioning plate 21 to removably hold said core centrally of the pan interior. The vertical formed edge 36 of the groove (Fig. 9) is provided with a rounded flare 37 to secure a relatively wide mouth to said groove whereby the core positioning plate 21 may be easily inserted in the grooves. The cover 25 of my preferred pan may then be slid over the top of this pan, lateral extension 38 therein serving as a guide or track for the rounded portions 28 on the cover.

In using my bun pan attachment, it is thought the better practice to place the previously rolled strip of dough substantially the width of the longitudinal length of the core so that the two ends of the strip are in substantial engagement with each other. The core with the wrapped bun dough thereon is then inserted into the pan and the cover placed thereon as previously described in the foregoing specification. The pan unit is thereafter placed in an oven having suitable temperature requirements and later taken therefrom as the finished baked bun product. Thereafter the cover is removed and in the case of the single attachment, the hooked portion of said attachment is grasped and moved upwardly, thereby removing the bun from the pan interior. It is then only necessary to slide the bun away from the core. In the event my attachment devices are fastened together as a unit by means of the bar 31, it is only necessary to grasp the bar at any central portion thereof and lift the unit away from the pans.

What is claimed is:

1. A bun pan having a bottom and side walls, a core removably positioned centrally of the pan interior and extending from one side wall and terminating adjacent an opposite side wall, a slidable cover plate for the pan and means associated with the cover and the pan for rigidly holding said core within the pan.

2. A bun pan having a bottom, side walls diverging from the bottom and a side wall having an aperture formed wholly therethrough, a hollow, longitudinal core having an open and a closed end, and means for removably holding the core centrally of the pan interior and comprising a plate positioned against the side wall having the aperture, a cover for the pan, and means associated with the cover and the pan for rigidly holding the plate in position said open core end being disposed to register with the aperture and said closed core end terminating adjacent a side wall opposed to the side wall having the aperture.

3. A bun pan having in its side wall an aperture formed wholly therethrough, a hollow, longitudinal core, having an open and a closed end, a plate fastened to the core and positioned against the side wall having the aperture, a hook portion on the plate engaging the top edge of the wall, a cover slidably positioned on the pan, an offset portion in the cover engaging the top of the hooked portion of the plate and a lug on the bottom of the pan and spaced from the side wall substantially the thickness of the plate said open core end being disposed to register with the aperture and said closed core end terminating adjacent the side wall opposed to the side wall having the aperture.

4. A bun pan having a bottom and side walls, a core, a plate fastened to the core and positioned against a side wall, a hook portion on the plate engaging the top edge of the side wall, a cover slidably positioned on the pan, an offset portion in the cover to engage the top of the hooked portion of the plate and a lug on the bottom of the pan and spaced from the side wall substantially the thickness of the plate.

5. A bun pan having a bottom, side walls diverging from the bottom and a side wall having an aperture formed wholly therethrough, a hollow, longitudinal core having an open and a closed end, means for removably holding the core centrally of the pan interior and comprising a tapered plate positioned against the side wall having the aperture therein, and substantially conforming to the dimensions thereof, a hook portion on the plate engaging the top edge of the side wall, a cover slidably positioned on the pan, an offset portion in the cover engaging the top of the hooked portion of the plate, and a lug on the bottom of the pan and spaced from the side wall substantially the thickness of the plate, said open core end being disposed to register with the aperture and said closed core end terminating adjacent the side wall opposed to the side wall having the aperture.

6. A bun pan having a bottom, side walls diverging from the bottom, and a side wall having an aperture formed wholly therethrough, a hollow longitudinal core having an open and a closed end, a plate for the core positioned against the side wall having the aperture and substantially conforming to the dimensions thereof, said open core end being disposed to register with the aperture and said closed core end terminating adjacent a side wall opposed to the side wall containing the aperture, and a slidable cover adapted to rigidly hold the plate within the pan.

JOHN E. STRIETELMEIER.